CALL TRACING METHOD AND ARRANGEMENT

Filed Oct. 7, 1965 10 Sheets-Sheet 1

INVENTORS
C. ABERT
W. C. SAND
BY
S E Hollander
ATTORNEY

CALL TRACING METHOD AND ARRANGEMENT

Filed Oct. 7, 1965

Nov. 19, 1968 C. ABERT ETAL 3,412,211

CALL TRACING METHOD AND ARRANGEMENT

Filed Oct. 7, 1965 10 Sheets-Sheet 8

1

3,412,211
CALL TRACING METHOD AND ARRANGEMENT
Charles Abert, Mantoloking, and William C. Sand, Summit, N.J., assignor to Bell Telephone Laboratories, Incorporated, New York, N.Y., a corporation of New York
Filed Oct. 7, 1965, Ser. No. 493,627
13 Claims. (Cl. 179—18)

ABSTRACT OF THE DISCLOSURE

The disclosure sets forth a method and arrangement for tracing annoyance calls in a telephone network. The annoyed customer's regular telephone number is disconnected and all calls to that number are intercepted. An intercept operator or automatic equipment communicates a fictitious number to the calling party which will route him through centralized call tracing and holding equipment to the called subscriber. If the call is a nuisance call, the called subscriber actuates the tracing equipment from his subset. The subscriber can be removed from the service by removing his directory number from intercept.

This invention relates to telephone systems and particularly to methods and arrangements for ascertaining the origin of calls through such systems.

In a more particular aspect this invention relates to call-tracing methods and arrangements wherein calls to a customer receiving annoying calls are routed over special facilities to permit the call to be traced for the purpose of identifying the calling customer.

In a very particular aspect, this invention relates to a method and arrangement for tracing the origin of calls in a telephone system whereby the annoyed customer's telephone is temporarily disconnected from its regular termination and made accessible via circuits especially adapted for call tracing.

In telephone systems, and particularly automatic telephone systems, it is sometimes desirable to ascertain the origin of particular calls. For example, customers are occasionally annoyed, insulted and even threatened by anonymous callers, and in connection with police work the need arises for determining the source of certain calls such as bomb threats, calls of an obscene nature, etc. While various call-tracing arrangements have been used in the past, these arrangements lack certain features which we have incorporated in the present invention.

Many prior art arrangements, for example, are only suitable for use on calls where the calling and called customers are served by the same switching office. These arrangements generally facilitate tracing by transferring control of the connection to the called customer who can place a holding condition on the intraoffice connection to prevent the calling customer from releasing until the calling customer has been identified. This holding condition might consist of applying a holding potential to the control conductor of the intraoffice connection to prevent the release of the associated switchtrain. It is well known in telephone switching, however, that these control conductors are usually confined to the switchtrain in a given office, and the placing of a holding condition on the control conductor at one office will not generally prevent the release of a connection which originated at a different office. It is also well known that this holding condition is usually effective only in offices of the step-by-step type.

It is, therefore, one object of our invention to improve call-tracing arrangements for both intraoffice and interoffice calls for many different types of switching offices.

Arrangements are also known for tracing calls which originate and terminate in different switching offices.

2

Certain of these arrangements place a special tracing signal on the control conductor of the connection at the annoyed customer's office. This tracing signal actuates special tracing equipment which automatically identifies the trunk incoming from the other office over which the nuisance call was received. Signals identifying the interoffice trunk are then sent to the calling office where the control conductor at the originating end of the interoffice trunk is marked with a similar type tracing signal. Special tracing equipment at the calling office is then actuated to trace the call through the switchtrain at the calling office to identify the originator of the call.

While these arrangements are suitable for their intended purpose, many of these arrangements require elaborate tracing equipment and complicated signaling systems to convey call-tracing information between distant offices.

It is, therefore, another object of our invention to simplify interoffice call-tracing arrangements by minimizing the need for special tracing equipment at the calling and called offices.

Other prior art call-tracing arrangements utilize trunk scanning equipment at each office in the network to detect the presence of a special nuisance call marking tone which is transmitted from the annoyed customer's office. Since the occurrence and the origin of an annoying call cannot be predicted, each office is equipped with a trunk scanner which must scan all trunks outgoing from that office to other offices. The trunk scanners are generally continuously searching for nuisance calls, and when the special nuisance call marking tone is detected on a trunk, the scanner locks to the trunk and causes an identification to be made.

It can readily be seen that in some of the larger switching offices hundreds of outgoing trunks have to be scanned, and this requires elaborate and costly scanning circuitry. Furthermore, during the time the scanning circuitry is engaged in identifying the originator of one call, other annoying calls might go undetected.

Accordingly, another object of our invention is to simplify nuisance call-tracing arrangements by directing all nuisance calls over special centralized facilities while utilizing as much of the existing switching network as practical.

In accordance with one illustrative embodiment of our invention, the telephone directory number of the recipient of annoying calls is temporarily disconnected from the telephone equipment associated with that customer, and all calls for that number are routed to intercept facilities. An intercept operator on an automatic announcing machine tells the calling party that the called party's number has been changed and also informs the calling party of th enumber at which the called party can be reached. For example, assuming that the telephone directory number for the customer being annoyed is CHelsea 3–9234, this number would be disconnected from that customer's telephone equipment, and all persons dialing the directory number would reach the intercept operator. The intercept operator would then inform the calling customer that the called customer's number has been changed, for example, to NUisance 7–2439.

The NUisance 7–2439 number is not the actual number assigned to the annoyed customer's telephone equipment at his switching office, but is a fictitious or theoretical number which will permit calls to be directed to the called party over centralized call-holding facilities at an intermediate switching office. More specifically, if the calling customer still wishes to complete the call, he would dial NU–7–2439, and the call would be routed over a special call-holding trunk to a tandem switching office. At the tandem switching office the digits NU–7–2439 would be utilized to select trunks to the CHelsea 3 switching office and, in addition, these digits could be translated into an unlisted number which has been temporarily assigned to the called customer's switching equipment at the CHelsea 3 exchange.

In lieu of translating the newly assigned number to an unlisted number the digits of the new number could be forwardly directly to the called office. Access to the new number would be restricted, however, to calls which are completed over the special call-holding trunk to preclude anyone from avoiding the trapping facilities.

After the call is completed via the call-holding facilities at the tandem office, if the annoyed party wishes to trap the call, he merely transmits a signal back over the connection to cause the connection to be held and an identification of the calling party made.

It should be noted that the NUisance 7 switching office designation has been purposely selected to forewarn calling customers that calls to this number are being handled in a special manner and that the calls may be traced. If it is desired, other less obvious office designations may be used so that the calling party would not be aware that the call might be traced and believe that the called party's number has merely been changed as a routine matter.

It should also be noted that in those instances where a number translation is made, only the fictitious number which directs the call via the call-holding facilities is revealed by the intercept operator to the calling customer while the unlisted number which is temporarily associated with the annoyed customer's telephone equipment is not revealed. The calling customer cannot, therefore, engage in conversation with the called party unless he dials the fictitious telephone number and traps himself by directing the call over the call-holding trunk. Under special circumstances the annoyed customer may wish to reveal to his close associates the unlisted number which is temporarily assigned to his equipment. This will permit those persons knowing this special number to dial the called customer directly without burdening the call-holding facilities at the tandem office with legitimate calls.

A feature of our invention resides in a call-holding arrangement wherein only certain facilities are used to trap annoyance calls and wherein the calls are purposely directed over these facilities.

Another feature of our invention is found in a call-tracing arrangement which uses a substantial amount of existing switching facilities to provide a universal call-tracing circuit.

A further feature of our invention resides in a call-holding arrangement wherein the called party can inform his associates of a special number to dial to reach his line bypassing the call-holding circuitry while other customers permit themselves to be trapped by directing their calls over the special call-holding facilities.

These and other objects and features of the invention will become readily apparent from the following description with respect to the drawing in which.

*General description*

The arrangement and operation of the various components in the illustrative embodiment of this invention will be described subsequently with reference to the detailed FIGS. 2–10. However, in order to first gain an overall understanding of the arrangement contemplated, a brief and general description will be given with reference to the block diagram in FIG. 1.

Figures 1, 11:
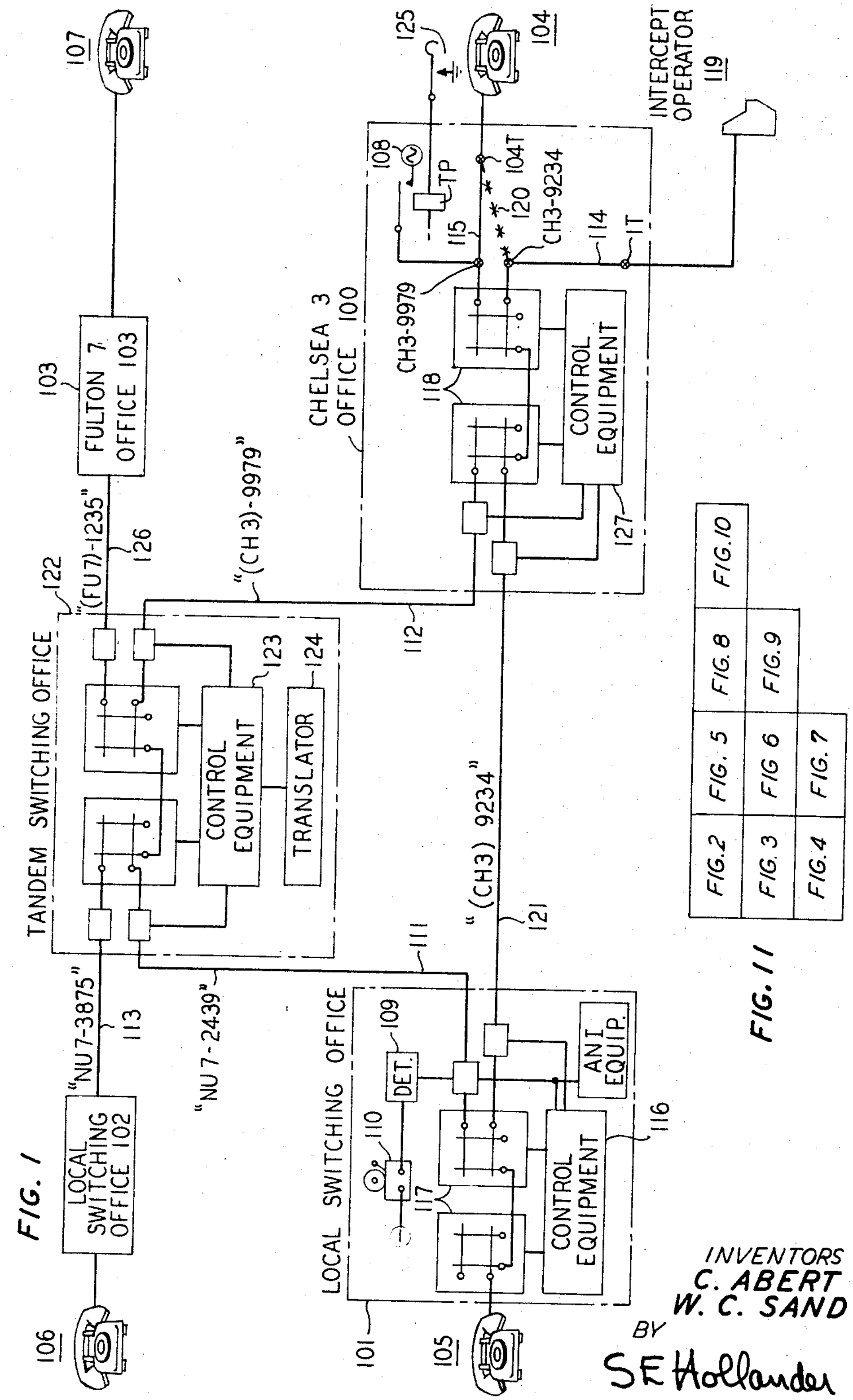
FIG. 1 shows a block diagram of the invention employed in a telephone switching network.
FIG. 11 shows the arrangement of FIGS. 2–10.

Turning now to FIG. 1 there is shown a typical telephone switching network comprising the CHelsea 3 switching office 100, the FUlton 7 switching office 103, local switching offices 101 and 102 and tandem switching office 122. The switching offices 100–103 are generally referred to as local switching offices, and they serve the many telephone customers in the various communities of the network. For simplicity, only customers 104, 105, 106 and 107 have been shown, but it will be realized that each of the switching offices is capable of serving many customers.

The switching offices are interconnected by trunks to permit the customers in one office to call the customers served by another office. If the traffic between two local offices warrants it, the offices may be connected by direct trunks such as trunk 121 between local switching offices 100 and 101. For traffic in excess of the direct trunk group between two offices and for traffic between offices which are remotely located from each other, trunks are provided to and from the tandem switching office 122.

Let it be assumed that the customer at station 104 served by the CHelsea 3 office is being bothered by nuisance calls from an unknown source and desires to have the calls traced. Station 104 would be provided with a signaling device, such as key 125, which operates trap relay TP to transmit tone from source 108 back over the established connection to the customer who originated the call.

At each local office certain trunks outgoing to the tandem switching office 122 are furnished with tone detectors such as detector 109 connected to trunk 111 at switching office 101. Tone detector 109 is responsive to the recipt of the nuisance call tone from a source such as 108 and holds a nuisance call connection at the calling office sounding alarm 110 to alert the maintenance personnel thereat. To simplify the apparatus necessary to effectively trap nuisance calls, only certain trunks to the tandem office have been furnished with tracing facilities, and it is necessary to route nuisance calls, which would normally be connected over direct trunks between the local switching offices, via these specially equipped tandem office trunks.

Each customer in the network is assigned a telephone directory number. Generally this number consists of the local office designation followed by a four-digit number address indicating the equipment in that office which has been assigned to the called customer. For purposes of illustration, the switching office 100 has been designated as the CHelsea 3 office, and all customers served by that office have their four-digit telephone number prefixed by the office code CH3. The customer at station 104 who has been receiving annoying calls is normally reached by dialing his directory number CH3–9234.

To facilitate routing the calls over the special call-holding trunk 111 to the tandem switching office, the directory number CH3–9234 is temporarily disconnected from the equipment serving customer 104 and is connected to intercept. This has been symbolically shown by the dashed line 120 being removed between equipment terminal 104T serving customer 104 and the number terminal designated CH3–9234, and a new connection 114 has been placed between the number terminal CH3–9234 and the intercept terminal IT.

Customer 104 has his equipment terminal 104T connected over conductors 115 to a new number terminal CH3–9979. Of course, the new number temporarily assigned to customer 104 will not be revealed to anyone but the customer at station 104.

Let it now be assumed the customer at station 105 wishes to call the customer at station 104. The customer at station 105 lifts his receiver and dials the number CH3–9234 which is listed in the telephone directory as being assigned to the customer at station 104. The control equipment 116 at the local office 101 responds to the dialing signals and establishes a channel connection over link frames 117 to direct trunk 121 outgoing to the CHelsea 3 switching office. Equipment at switching office 101 deletes the office code CH3 and outpulses the digits 9234 over trunk 121 to the CHelsea 3 office 100 where a channel connection is established over link frames 118 to number terminal CH3–9234. The number to which the call is being directed has been shown adjacent to the trunk 121, and the office code CH3 has been enclosed in parentheses to illustrate that these digits can be deleted and need not be outpulsed to the called office.

It will be recalled that number terminal CH3–9234 at local office 100 is no longer connected to the equipment serving customer 104 but is connected over conductors 114 to intercept terminal IT and to the intercept operator 119. The intercept operator, or an automatic announcing trunk associated therewith, will inform calling customer 105 that the number he has dialed has been changed to NUisance 7–2439 and the calling customer must redial if he still wishes to converse with the customer at station 104.

The NUisance 7 (NU7) office code designation has been purposely chosen to forewarn the calling customer that this call is suspected of being an annoyance call and may be subjected to tracing. It is believed that by the selection of the proper central office designation, such as NUisance 7, this will act as a deterrent for the originators of nuisance calls. Experience has taught that the originators of annoying calls are often pranksters who will hesitate to place objectionable calls if they are warned that someone is trying to discover them. On the other hand, an arbitrary office code such as 555 might be used instead of NU7. This would still permit routing calls over the centralized call-holding facilities without warning the calling party that the call is to be handed in a special manner.

It should be noted that the NUisance 7 office designation is theoretical in the sense that it does not denote a particular local switching office as do the CHelsea 3 and FUlton 7 central office designations. Instead the designation NUisance 7 will direct calls from any office in the network to the tandem switching office 122 where a special translation will be made to determine to which local office the call is to be directed.

More specifically, when customer 105 dials the number NU7–2439, the control equipment 116 recognizes from the first three digits NU7 that the call must be forwarded over special trunk 111 to the tandem office. At the tandem office the control equipment 123 and translator 124 utilize the office code and the first three digits of the number, that is, NU7–243, to ascertain to which of the local offices the call is to be directed. After determining that the customer is at the CHelsea 3 office, the four-digit number 2439, which was received at the tandem office, is converted to the unlisted number 9979 which is to be outpulsed to the CHelsea 3 office. It will be recalled from the prior description that the number 9979 has been temporarily assigned at the CHelsea 3 office to the customer 104, but this number has not been revealed to the calling customer.

In a similiar manner calls to customer 107 at the FUlton 7 switching office could be trapped by disconnecting the directory number of the annoyed customer 107 at that exchange and telling the calling customers to dial a number, such as NUisance 7–3875. Upon dialing the NUisance 7–3875 number from a local office, such as switching office 102, the local control equipment thereat would recognize the NU7 and direct the call over trunk 113 to the tandem office. The control equipment 123 and translator 124 would recognize the theoretical office code and the first three digits NU 7–387 as a call for the FUlton 7 exchange and select trunk 126 for completing the call. In addition, the four digits 3875 could be converted to a number such as 1235 which has been temporarily assigned to customer 107.

The digits 1235 would then be outpulsed over trunk 126 to the FUlton 7 office where a connection to customer 107 would be established.

Returning now to the description of a call from customer 105 to customer 104, it will be recalled that customer 105 had dialed NU7–2439. The fictitious office code NU7 caused the control equipment 116 to select trunk 111 to the tandem office. At the tandem office the NU7–243 caused trunk 112 to the CHelsea 3 office to be selected, the 2439 was converted to 9979, and the number 9979 was outpulsed over the trunk. Upon receiving the number 9979, control equipment 127 at the CHelsea 3 office established a channel connection over link frames 118 and over conductors 115 to station 104. A ringing signal is then transmitted to station 104 to alert the customer thereat.

If upon answering the call the customer at station 104 wishes to have the connection traced, he actuates his special signaling device 125 which in turn operates trapping relay TP. Relay TP in operating transmits a nuisance call tracing tone from source 108, back over the connection on link frames 118, over trunk 112, and through the tandem office switchtrain, and back over trunk 111 to actuate tone detector 109 at the calling office. In operating, tone detector 109 sounds the alarm bell 110 to alert the maintenance personnel, and in addition, causes the connection at office 101 to be held for tracing. The connection may be traced by the maintenance man or by automatic identification equipment (ANI), if available.

In lieu of translating the fictitious number, 2439 in the above example, into the special unlisted number 9979 and forwarding the unlisted number to the called office, the fictitious number could be forwarded directly to the called office. To preclude the calling customer from obtaining direct access to the called number by prefixing the fictitious number 2439 with the CHelsea 3 office code and thereby avoiding the call-holding trunk, access to the number 2439 would be restricted to calls routed via call-holding facilities at the tandem office. This can be accomplished in any one of several known ways such as the use of trunk class discrimination, separate trunk groups, etc.

*Detailed description*

Having briefly described our invention with respect to the block diagram of FIG. 1, a more detailed description will now be given with respect to FIGS. 2–10.

*Arrangement of equipment*

Figure 2:
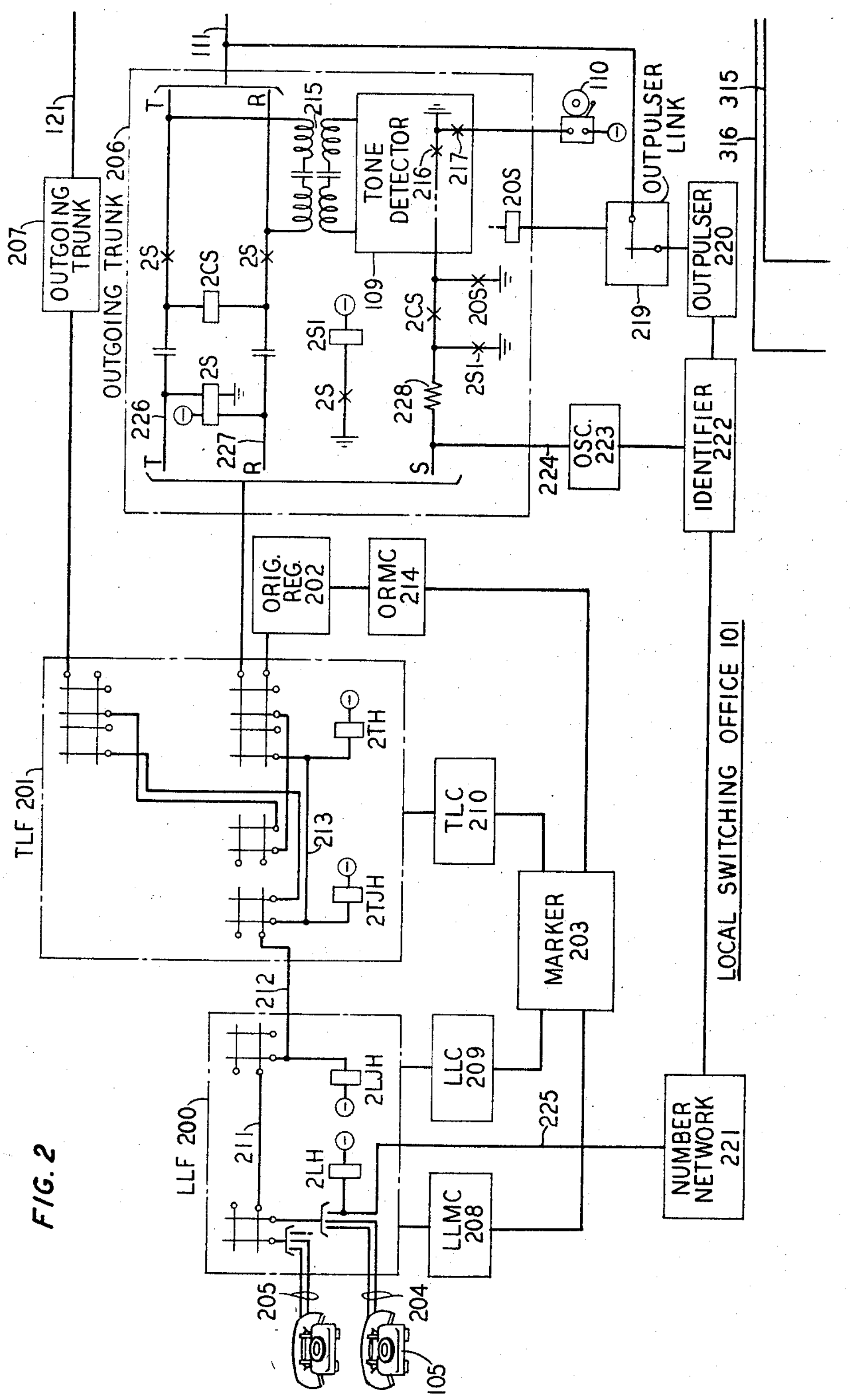
FIGS. 2–10 show a more detailed schematic representation of one illustrative embodiment of our invention in the same telephone switching network depicted in FIG. 1.
Figure 3:
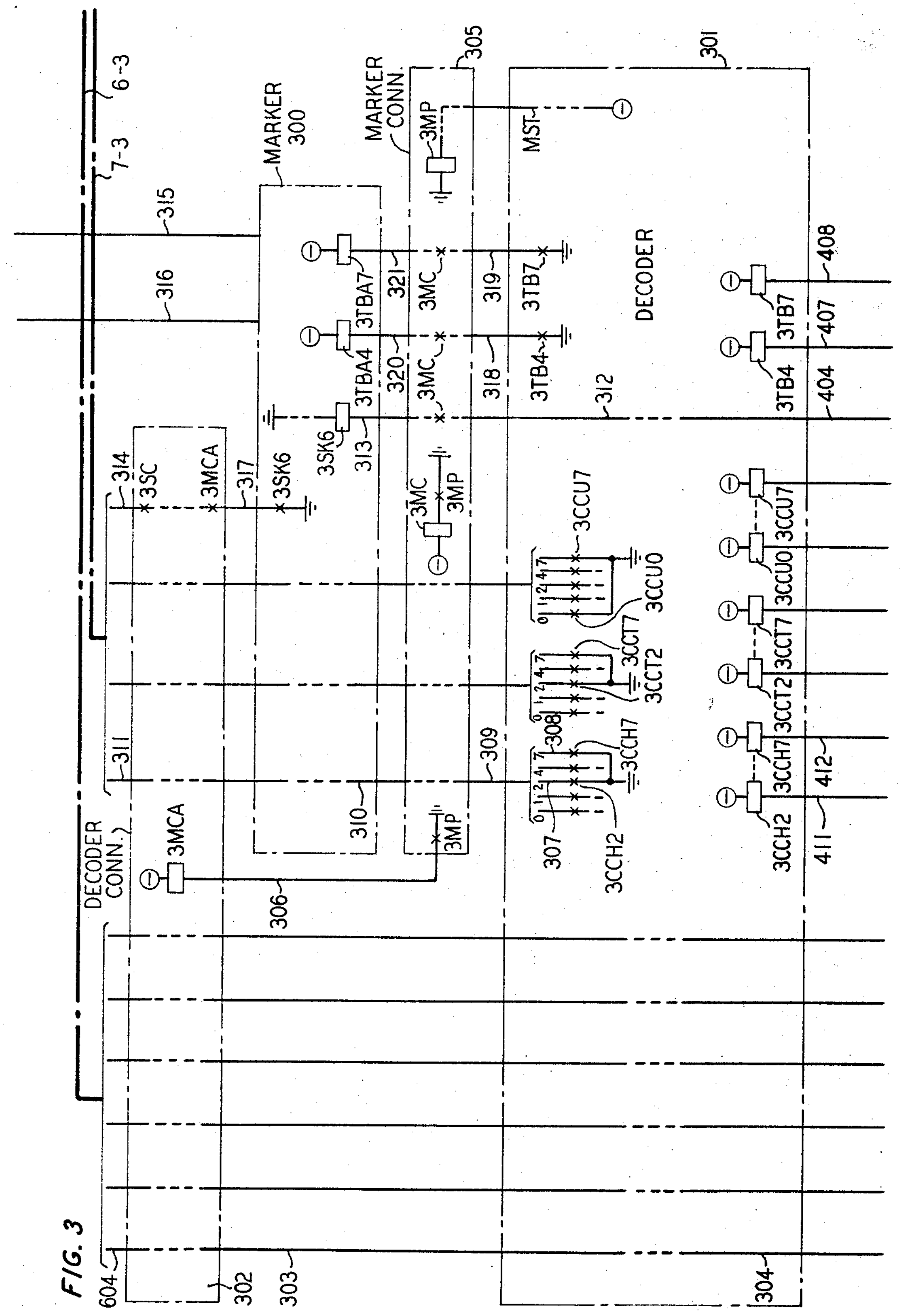
Figure 7:
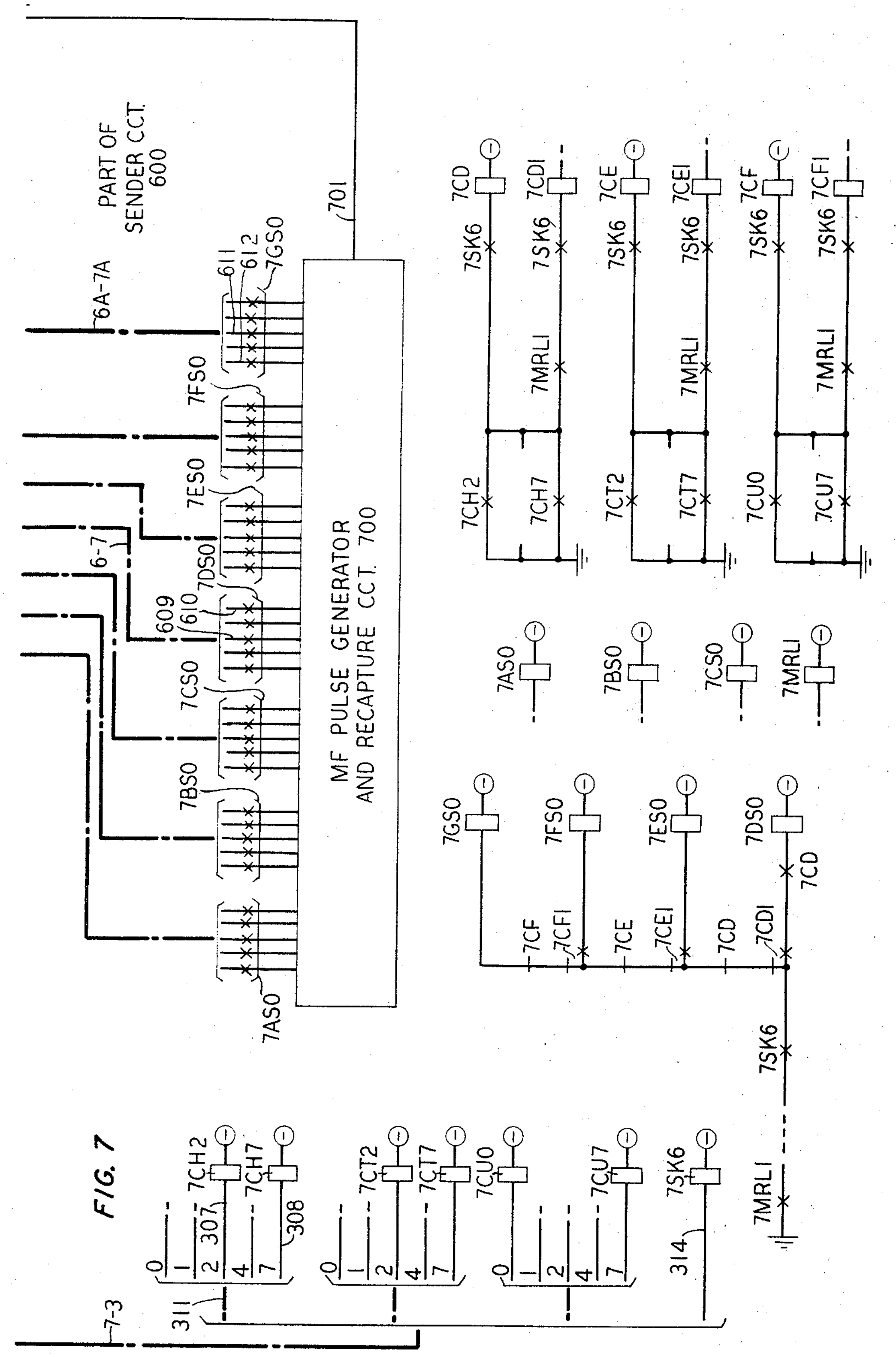
Figure 8:
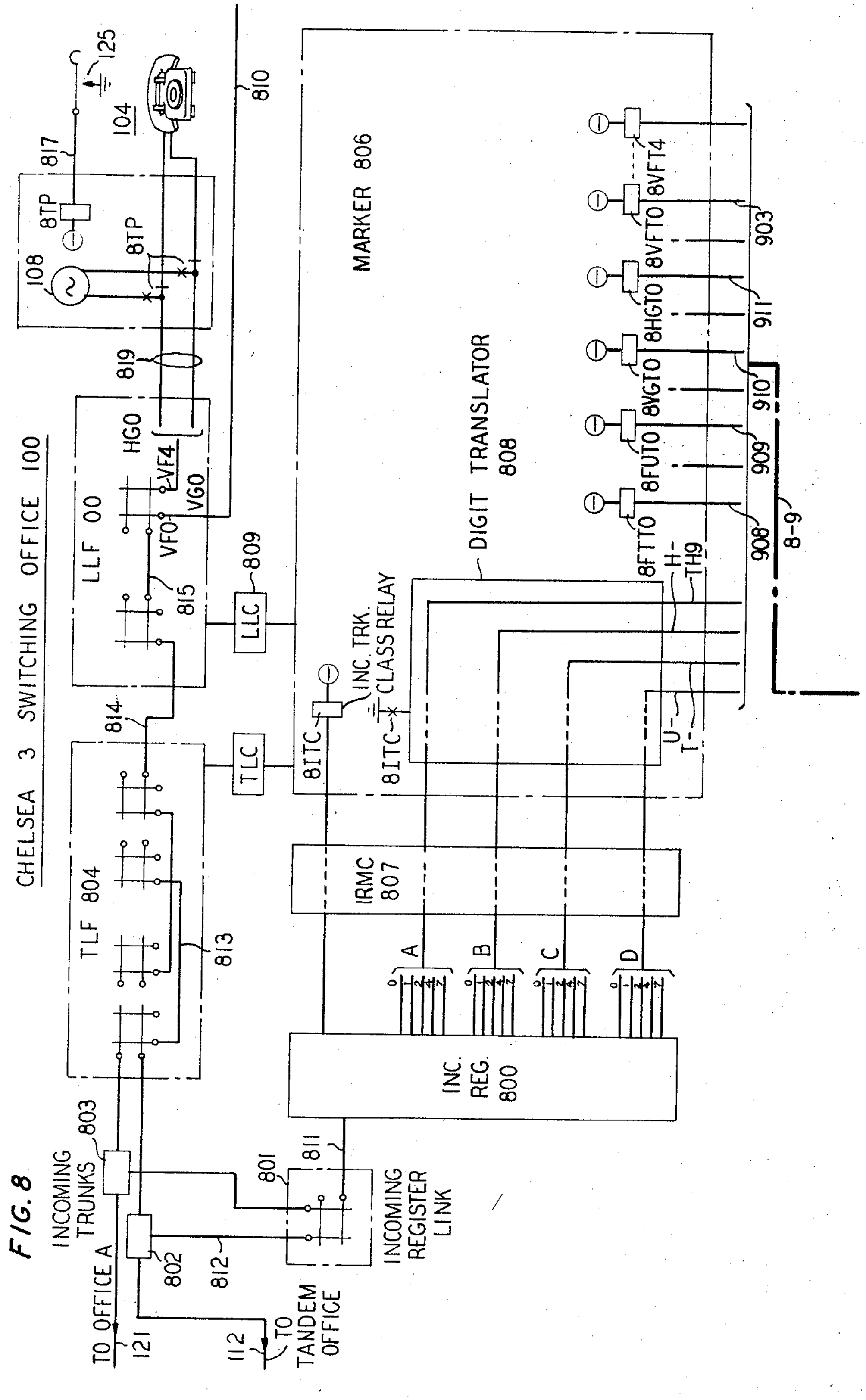
Figure 9:
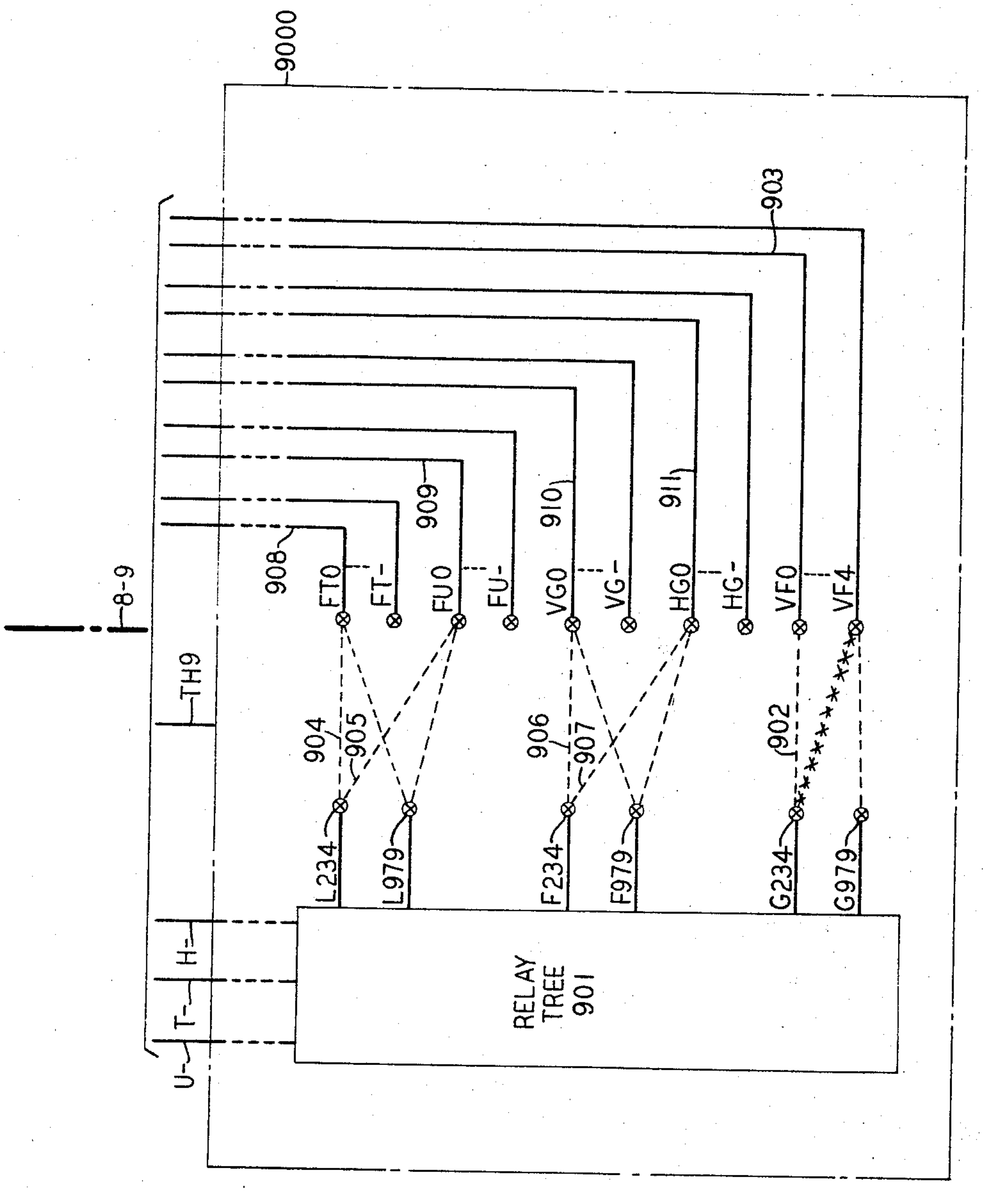
Figure 10:
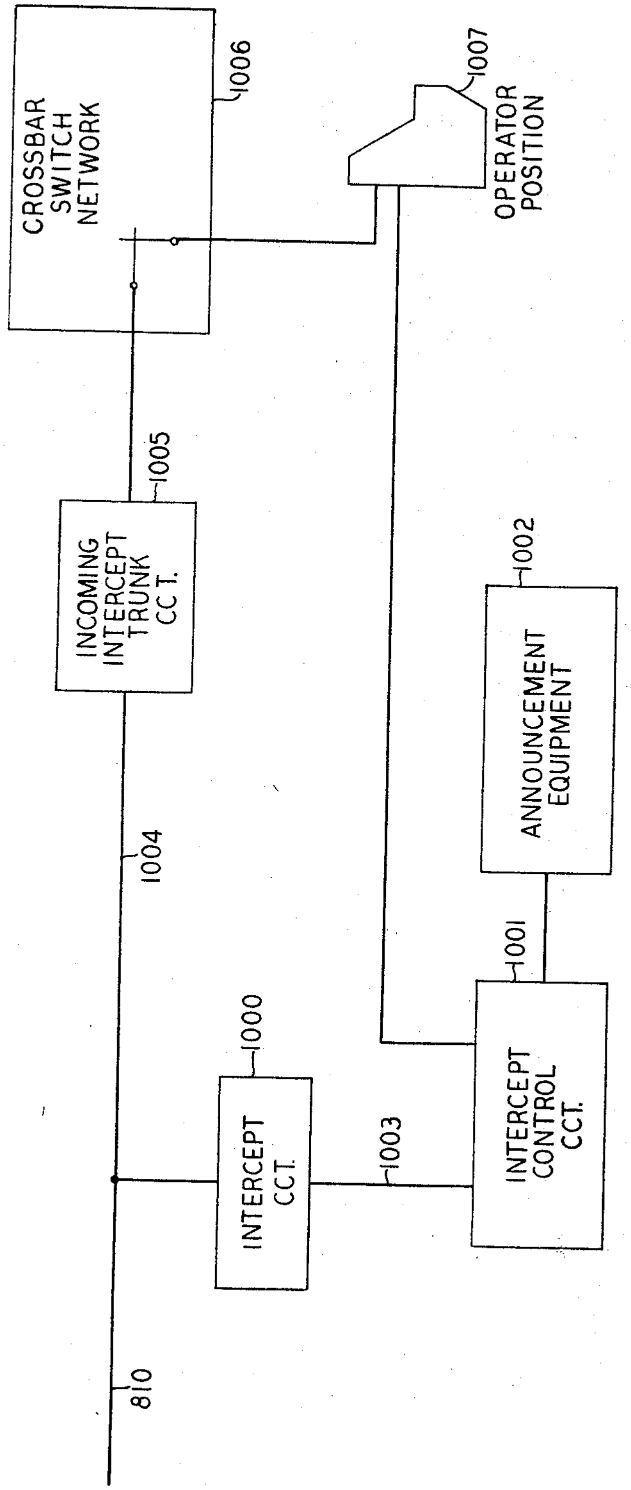

In FIGS. 2–10, when arranged in accordance with FIG. 11, there is shown a more detailed schematic representation of the telephone network depicted in FIG. 1. More specifically, FIG. 2 shows part of the local switching office 101, FIGS. 3–7 show part of the tandem switching office 122, FIGS. 8 and 9 show part of the CHelsea 3 switching office 100 and FIG. 10 shows intercept equipment which may be located at the CHelsea 3 switching office.

The local switching offices shown in FIGS. 2, 8 and 9 can be equipped with any one of the many well-known types of telephone switching systems such as the crossbar system disclosed in Patent 2,585,904 to A. J. Busch of Feb. 19, 1952. To simplify the drawing only that portion of the Busch switching system has been shown which is necessary to illustrate the operation of our invention, and it will be understood that the Busch patent cited above is hereby incorporated by reference as fully disclosed herein.

In the Busch patent there is shown a crossbar telephone switching system comprising line link frames such as line link frame 200 on which customer lines are terminated, trunk link frames such as trunk link frame 201 on which trunks and originating registers are terminated and various elements of common control apparatus such as marker 203 for effecting connections between circuits which are terminated on the line and trunk link frames. While it is to be understood that local switching office 101 serves many customer lines and trunks only customer lines 204 and 205 and trunk circuits 206 and 207 have been shown to simplify the drawing.

Marker 203 recognizes requests for service from various customer lines on line link frame 200 and controls the establishment of channel connections between these lines and trunk circuits or originating registers such as register 202 on trunk link frame 201. Originating register 202, on the other hand, registers the called party's telephone number which is transmitted by the dialing signals of the calling customer and registers other information necessary for completing the call.

The crossbar switching office 100 depicted in FIGS. 8 and 9 can be identical to the local switching office 101 and the system disclosed in the aforementioned Busch patent. However, since the calls to be subsequently described involve the completion of a connection to a called party in switching office 101, only the control equipment necessary for terminating a call at that office has been shown. More specifically, incoming register 800 is connected via incoming register link 801 to trunks 802 and 803 which terminate on trunk link frame 804. Incoming register 800 receives the called customer's telephone number as it is outpulsed from another switching office in the network. Using the telephone number received from incoming register 800, marker 806 ascertains the line link frame location of the called customer by interrogating a number group such as 9000 in FIG. 9. After ascertaining the called customer's line link frame equipment location, marker 806 establishes a channel connection between the incoming trunk and the called line.

FIG. 10 shows in block diagram form a typical intercept arrangement which is suitable for use in our invention. An example of one such arrangement can be found in Patent 3,111,561 to S. F. Dunning of Nov. 16, 1963, and the Dunning patent is hereby incorporated by reference as though fully disclosed herein.

While the local switching offices 100 and 101 are connected by direct trunks such as trunk 121, under certain circumstances calls between these offices may be routed via an intermediate office such as the tandem switching office 122 shown in FIGS. 3–7. For example, if all of the direct trunks between the local offices are busy, if the amount of traffic does not warrant a direct trunk route between the local offices or if signaling between the two local offices is not compatible, then calls may be routed via the tandem switching office. Similarly, and in accordance with one feature of our invention, if the calls are to be handed in a special manner to facilitate the tracing of nuisance calls, then these calls can be routed via centralized call-holding equipment at the tandem switching office 122.

The tandem switching office can be equipped with any one of the many familiar types of switching systems such as the system disclosed in patent 2,868,884 to J. W. Gooderham et al. of Jan. 13, 1959. While only a few components of that system have been shown herein and these have been represented in an abbreviated diagram of that system, it is to be understood that the Gooderham et al. patent is hereby incorporated by reference as though fully disclosed herein.

As set forth in detail in the Gooderham et al. disclosure, that switching system comprises a plurality of incoming link frames such as incoming link 500 on which trunks incoming from other offices are terminated, a plurality of outgoing link frames such as frame 501 on which trunks outgoing to other offices are terminated and various elements of common control equipment for controlling connections between incoming and outgoing trunks. In a manner which is typical of many similar switching systems, a sender such as sender circuit 600 in FIGS. 6 and 7 receives the digits of the called telephone number over an incoming trunk. With the aid of marker 300, decoder 301 and translator 400, the routing of the call is ascertained, and a connection is established between the incoming trunk and the outgoing trunk selected to the called customer's office. For simplicity only trunk circuits 502 and 503 connected to local offices 101 and 100, respectively, have been shown and it will be realized that tandem switching office 122 may comprise many hundreds of trunks connected to these and other switching offices.

A better understanding of the arrangement contemplated will be realized from the ensuing description with respect to the establishment of typical calls between various customers served by this system.

*Call to directory number CH3–9234*

Let it be assumed that the customer at station 104 served by the CHelsea 3 switching office 100 is receiving nuisance calls from an unknown source and wishes to have these calls traced to ascertain the identity of the calling party. Let it also be assumed that the calls are being made from station 105 at switching office 101.

It will be recalled in the general description that customer station 104 has been assigned a directory number CHelsea 3–9234, and under normal circumstances a calling customer would dial the assigned directory number (CH3–9234) to connect with station 104. Since the customer at station 104 desires to have his calls routed via special trapping facilities, his directory number will be temporarily disconnected and associated with intercept equipment so that all persons dialing this number will now be routed to intercept. The intercept facilities will be used to inform the calling party of the correct number which must be dialed in order to gain access to the customer at station 104.

In this embodiment of the invention we have selected the fictitious central office designation NUisance 7 for all calls in a network which require special tracing services. In other words, any customer in the network who desires to have calls to his station monitored will have the first three digits of his directory number changed from the normal central office designation to the NUisance 7 designation. For the customers at switching office 100 whose directory numbers are CH3–XXXX (where X represents any digit from 0 to 9) the new fictitious number will be NU7–XXXX. In addition the last four digits will also be changed to a special unlisted number at the CHelsea 3 exchange.

The new number temporarily assigned for the purpose of trapping nuisance calls has been referred to as a fictitious or theoretical number because, in reality, the number does not represent the actual equipment location at the local office of the called customer. That is to say, the fictitious number must first be translated to the proper central office designation and converted to the new unlisted telephone number assigned to the called party in order to complete the call, and it is the unlisted number at the local office which identifies the called customer's line termination.

In the example being described the number listed in the telephone directory for station 104 is CHelsea 3–9234, but this number has been changed to a nonworking number and calls to the directory number will be directed to intercept. The fictitious number temporarily assigned to station 104 is NUisance 7–2439, and all calls to that number will be routed via special centralized call tracing facilities at the tandem office. At the tandem office the NU7–2439 is used to direct a call to the local switching office 100 of the called customer, and the number is converted to the unlisted working number CH3–9979 of the called customer.

By using a fictitious number and translating the number into a special unlisted working number assigned to the called customer, the chance of the nuisance caller avoiding detection is minimized. For example, assume that the called party's number had been changed in such a manner that the first three characters, i.e., the central office designation, cause the call to be routed over the special facilities, but that no conversion is made of the last four digits, and the last four digits actually represent the working line terminal of the called party. Knowing that the called party has not changed his residence and is still served by the same switching office, the calling party might deduce that the nuisance call trap could be avoided by prefixing the actual working number with the three characters CH3 of the local central office designation instead of using the special office code NU7. In this manner the calling party would be able to complete directly to the unlisted number and avoid being trapped.

In accordance with one feature of our invention the fictitious number which is revealed to the calling party has no immediate relationship to the unlisted working number actually assigned to the called party's line termination. With this arrangement if the calling party persists in placing the call, he in effect, traps himself by dialing the fictitious number.

Converting the fictitious number into an unlisted number and revealing only the fictitious number to the caller is one way of preventing the calling party from avoiding the call-holding facilities. In the alternative, special class marks could be transmitted to the called office to prevent access to the annoyed party's line from calls other than those routed via the call-holding trunk. Similarly separate facilities only available via the tandem office call-holding trunk could be used to serve the called line. These and other arrangements can be utilized to assure the call is directed via the trapping facilities without departing from the spirit and scope of the invention.

Let it be assumed that the customer at station 105 (FIG. 2) wishes to place a call to the customer at station 104 (FIG. 8), and not knowing of the temporary number change, the customer at station 105 will dial CH3–9234. The customer at station 105 first lifts his receiver initiating a service request at switching office 101 by operating his line relay (not shown) on line link frame 200. This service request causes marker 203 to be seized via line link marker connector 208, and marker 203 selects an idle originating register such as register 202. Having selected an idle register and forwarding the equipment location of line 105 thereto, marker 203 seizes control of the line link frame 200 and the trunk link frame 201 via line link connector 209 and trunk link connector 210, respectively, and establishes a channel connection comprising links 211, 212 and 213 between station 105 and originating register 202. To simplify the drawing, the channel has been shown as a single line representing the sleeve or control conductor of the channel, and it will be realized that other conductors, such as transmission conductors, are extended between the various link frames.

Register 202 returns dial tone over the channel connection, and the calling customer dials the called party's directory number CH3–9234 which is stored in originating register 202. At the completion of dialing, register 202 seizes marker 203 via originating register marker connector 214 and forwards the calling line location of station 105 and the called number to the marker.

Marker 203 ascertains from the called office code designation CH3 that there are direct trunks to switching office 100, and marker 203 selects an idle trunk such as trunk 207 for completing the connection. The marker then connects a sender (not shown) to the trunk and primes the sender with the digits of the called party's directory number and interconnects station 105 with the outgoing trunk 207 over a channel connection in a manner similar to the interconnection of the calling station with the originating register. A signal is now sent over trunk conductors 121 to the distant switching office 100 to prepare the equipment thereat for receiving the called party's directory number.

Turning now to the called office in FIGS. 8 and 9, the trunk seizure signal from the calling office 101 is received over the trunk conductors 121 to actuate circuitry in the incoming trunk equipment 803 in a well-known manner. When actuated, trunk equipment 803 causes incoming register 800 to be connected to it via incoming register link 801. When the incoming register 800 is connected to the trunk, a start-dial signal is transmitted back over the trunk conductors 121 to the calling office requesting that the sender thereat outpulse the digits of the called number. Since there are direct trunks between the two offices, the central office designation CH3 can be deleted and only the last four digits of the directory number need be outpulsed.

Upon receiving the information outpulsed from the calling office, register 800 bids for an idle marker such as marker 806, and register 800 is connected to the marker 806 via incoming register marker connector 807. Only the four digits "9234" are to be received by register 800 and these digits will be registered on the A, B, C and D registration relays (not shown) on a two-out-of-five basis. For example, the first digit 9 would be received and registered on the A7 and A2 registration relays, the second digit 2 would be registered on relays B0 and B2 and so on. The information registered in the incoming register 800 is forwarded over the A digit conductors 0, 1, 2, 4 and 7, the B digits conductors 0, 1, 2, 4 and 7, etc., to the digit translator 808 in the marker. The digit translator 808 translates the received code into the thousands, hundreds, tens and units digits of the called number. Since this is a four-digit call, the information registered in the A digit register represents the thousands digit of the called line, the information registered in the B digit register represents the hundreds digit, and so on.

Having received the called number, the marker must ascertain the line link frame equipment location on which the station assigned to that number is terminated. To aid in translating the four-digit number into an equipment location a number group frame is used. As explained more fully in the aforementioned Busch patent, each number group frame serves one thousand telephone numbers and is capable of translating each telephone number into a line link frame, vertical group, horizontal group and vertical file equipment location which is assigned to that number. This is accomplished by seizing control of the particular number group based on the thousands digit of the called number, and then through a relay tree, grounding terminals associated wtih the hundreds, tens and units digits of the called number.

Since the number to be translated is 9234, marker 806 seizes control of number group 9000 over conductor TH9 in cable 8–9. Number group 9000 is the number group for translating the equipment location of numbers from 9000 to 9999. Having seized control of the number group, the hundreds, tens and units digits are transmitted from the marker to the number group over conductors H-, T- and U- in cable 8–9. There, through the operation of relay tree 901, the terminals L234, F234 and G234, which represent the number 9234, are grounded. It will be noted that the number terminal L234 is cross connected over cross connections 904 and 905 to terminals FT0 and FU0, number terminal F234 is cross connected over cross connections 906 and 907 to terminals VG0 and HG0 and number terminal G234 which was formerly connected to terminal VF4 (as indicated by the crossed out dotted line) is now connected over cross connection 902 to terminal VF0. The grounds from the L-, F- and G- number terminals are extended over these cross connections and back over the appropriate conductors in cable 8–9 to operate line equipment location relays in the marker. For example, the ground from number terminal L234 is extended over conductors 908 and 909 to operate relays FTT0 and FUT0 indicating that the called line is located on line link frame 00. Similarly, the ground on number terminal F234 is extended over conductors 910 and 911 to operate relays VGT0 and HGT0 indicating to the marker that the called line is in vertical group 0 and horizontal group 0 of the designated line link frame.

Furthermore, the ground from number terminal G234 is extended over cross connection 902 and conductor 903 to operate relay VFT0 indicating that the called line is terminated on vertical file 0.

Having ascertained the equipment location assigned to the directory number CH3–9234 the marker will then seize line link frame 00 via line link connector 809 and establish a connection between the equipment terminal in vertical group 0, horizontal group 0 and vertical file 0 on line link frame 00 and the incoming trunk 803 on trunk link frame 804.

It will be noted that in reality the customer station 104 is not terminated on vertical file VF0 but is terminated on vertical file VF4. The termination to which the marker will extend the connection is, however, connected over conductors 810 to the intercept facilities shown in FIG. 10.

The intercept arrangement shown in FIG. 10 can be any one of the many well-known arrangements for providing automatic announcements and, if necessary, operator assistance. One such arrangement is disclosed in the aforementioned patent 3,111,561 to S. F. Dunning, but it will be appreciated that other arrangements are equally suitable for use in our invention.

To simplify the instant disclosure the intercept arrangement has been represented in block diagram form which will suffice for a complete understanding of the present invention.

As was set forth in the Dunning patent, a call is received from the switching office over intercept trunk conductors 810, and the switching office functions in the usual manner by applying a ringing signal to the trunk. The ringing signal operates intercept circuit 1000 which in turn operates intercept control circuit 1001. The latter circuit functions to trip the central office ringing, apply a supervisory holding condition to the equipment at the central office and to connect the call to announcement equipment 1002.

A previously recorded message contained in announcement equipment 1002 is transmitted over conductors 1003, trunk conductors 810 and back over the established connection to switching office 101 and to the calling customer at station 105. The message would inform the calling customer that the number he has dialed (CH3–9234) is no longer a working number and if the customer still wishes to complete the call, the new number to dial is NUisance 7–2439. This message may be repeated and, if necessary, followed by a message telling the calling party to wait for the operator to answer the call if he requires assistance. At the end of the announcement announcing equipment 1002 signals the intercept control circuit 1001 to route the call to an operator. The call is then extended over conductors 1004, intercept trunk circuit 1005 through crossbar switching network 1006 to the operator's position 1007. The attendant at position 1007 can then render any assistance that the calling customer at station 105 requires.

*Call to NUisance 7–2439*

Let it be assumed that the customer at station 105 still persists in placing a call to the customer at station 104 and now places a new call by dialing NU 7–2439 in accordance with the instructions received from the intercept facilities.

The equipment at switching office 101 functions in the same manner as previously described with respect to a call to the directory number CH3–9234 except that the marker 203 (FIG. 2) will now recognize the NU7 office code and selects a trunk such as trunk 206 to the tandem switching office 122.

It will be noted in FIG. 2 that the outgoing trunk 206 is equipped with a tone detector represented by the block diagram 109. Tone detecor 109 is coupled to the transmission conductors of trunk 206 and is responsive to the receipt of a special tone for holding the switchtrain at the calling office 101.

When the line conductors 204 of station 105 are coupled to the tip and ring conductors 226 and 227 of trunk circuit 206, supervisory relay 2S operates over a loop circuit, including station 105, and completes an obvious circuit for operating relay 2S1. Relay 2S1, in operating, extends ground over sleeve conductor 228 to hold operated hold magnets 2TH, 2TJH, 2LJH and 2LH. These hold magnets maintain the connection between station 105 and the outgoing trunk 206 under control of the calling customer's switchhook in a well-known manner. As will be shown subsequently, relay 2CS provides an additional holding ground to prevent the release of the switchtrain should the customer at station 105 attempt to disconnect before the call is traced.

In accordance with a feature of our invention all calls in a network which require call tracing service will be handled in a special manner, that is, the calling customer will be told to dial a special central office designation (NUisance 7) which causes the call to be routed via centralized facilities at tandem switching 122. With this arrangement each local office, such as office 101, need only have a few outgoing trunks equipped with special holding facilities, and the trunks would be selected by virtue of the theoretical central office designation NUisance 7.

Having selected trunk 206 at switching office 101 marker 203 thereat couples a sender (not shown) to the trunk, and the sender waits for a sender to be attached at the tandem office. When trunk 206 is seized at local office 101 a signal is sent over conductors 111 to actuate incoming trunk circuit 502 at the tandem office. Trunk circuit 502, in turn, signals over conductor 504 to operate start relay 5ST in sender link 505 requesting that the proper type sender be attached to the trunk in order to receive the digits to be subsequently outpulsed over conductors 111 from the calling office. Sender link 505 with the cooperation of link control circuit 506 selects an idle sender such as sender 600 in FIGS. 6 and 7 and closes the proper crosspoints on the primary and secondary switches to interconnect the incoming trunk with the sender. When the crosspoints are closed on the sender link frame the trunk conductors 111 from the calling office are extended over conductors 507, link 508 on sender link 505 and over conductors 509 to the digit register 601 in sender circuit 600.

Once sender 600 is connected via sender link 505 to the incoming trunk circuit 502, the sender at the calling office can outpulse the called number, and this number is stored in digit register 601.

Digit register 601 comprises a plurality of relays for storing the digits received from the calling office on a two-out-of-five basis. For simplicity only the contacts of the 6A- through 6G- registration relays have been shown and each of these relays records one of the digits for the called number NU7–2439. Since the first letter of the called number, i.e., N is equivalent to the number 6 on a conventional telephone dial, the number 6 would be stored on the A digit register and relays 6A4 and 6A2 would be operated.

After sender 600 has received and registered the digits outpulsed from switching office 101, sender 600 connects itself to decoder 301 via decoder connector 302. Decoder 301 functions in conjunction with translator 400 to translate the received digits into the proper routing instructions so that the appropriate outgoing trunk can be selected and the proper information outpulsed over this trunk to the called office. Decoder 301 shown in FIG. 3 can be identical to the decoder disclosed in the aforementioned Gooderham et al. patent and wherever possible the reference designations used in that patent have been retained herein except that they are preceded with the figure number of the instant drawing in which they appear.

In the Gooderham et al. patent it was shown that each decoder is an assembly of control circuits for enabling the seizure of a translator which translates the information received from a sender concerning the destination of the desired call, into information required by a marker to extend the call to the called office. To enable the translation of information concerning the destination of a desired call into directive information for enabling a marker to control connections at the tandem office, a card translator was disclosed in the Gooderham et al. patent. For simplicity an abbreviated block diagram of a similar translator has been shown in FIG. 4. It will be understood that a complete description of the translator and its capabilities can be found in the Gooderham et al. patent; however, a brief description will be helpful at this time for a better understanding of our invention.

As disclosed in the Gooderham patent the translator comprises a plurality of cards upon which various bits of information such as routing instructions, trunk location, code conversion information, etc., are stored. Ordinarily the selection of a card is determined by the first three digits received in the sender. However, under certain circumstances the six-digit translation is made wherein particular cards are read on the basis of the first six digits received in the sender.

Essentially, the card translator consists of a file of selectable perforated cards. Each card has a series of holes perforated therein representing information which is stored on the card. Along one edge of the card is a series of tabs. A card is provided for each code that is to be translated, and the cards have certain of the tabs removed leaving only those tabs corresponding to the code to be translated.

It will be recalled that the first three characters NU7 represent a hypothetical central office for the purpose of directing all annoyance calls in the network over centralized facilities at the tandem office. Since the tandem switching office 122 can complete calls to customers at many different local switching offices, the hypothetical office code (NU7) is insufficient to determine which local office is serving the particular customer being called. In this illustrative embodiment of our invention, therefore, a translation of the office code and the first three digits, i.e., NU7–243 will be made. The code NU7 is used to signify that the call is to be handled in a special manner, and the digits 243 indicate the called office.

When a card is to be selected the code bar relays corresponding to the code to be translated are operated causing the corresponding translator code bars to be actuated so that the one card whose remaining tabs correspond to the six-digit code is properly positioned for reading. Once the card is properly positioned, light is permitted to pass through the holes which have been previously punched in the card to corresponding phototransistors whose outputs indicate various items of information such as code conversion, trunk location, trunk class, etc. A more detailed description of the operation of the card translator is found in the aforementioned Gooderham et al. patent, and only a small portion of this translator has been depicted herein to illustrate its operation in our invention.

It will be remembered that sender 600 has received and registered the digits NU7–2439 in digit register 601. Accordingly, registration relays 6A2, 6A4, 6B1, 6B7, 6C0, 6C7, 6D0, 6D2, 6E0, 6E4, 6F1, 6F2, 6G2 and 6G7, of which only the contacts have been shown, will be operated as described above. A circuit would be closed, therefore, from contacts on relays 6A2 and 6A4, over conductors 602 and 603 in cable 604 which is part of larger cable 6–3 extending to FIG. 3, through decoder connector 302 and over cable 303 to decoder 301, through equipment not shown in decoder 301 and over cable 304 to FIG. 4, through translator connector 401 and through the windings of code bar relays 4A2 and 4A4 to battery, operating these code bar relays. Similar circuits are closed by each of the other operated register relays in the sender to operate the corresponding code bar relays 4B1, 4B7, 4C0, 4C7, 4D0, 4D2, 4E0, 4E4, 4F1 and 4F2 in translator 400. Several other relays (not shown) in the translator 400 operate to position and read the selected card, and once the card is read the output information is transmitted back to the decoder.

It has been assumed that the call being described is one which may be completed by reading a six-digit card identified by the code NU7-243. To subsequently control the operation of the marker in selecting a trunk to the called office (switching office 101) two trunk block holes, for example, TB4 and TB7, are punched in the card to indicate that the trunks to switching office 101 are located on trunk block 00. This has been shown in FIG. 4 by the operation of contacts 4TB4 and 4TB7 which extend ground over conductors 405 and 406, through contacts of translator connector relay 4C0, over conductors 407 and 408 to FIG. 3 and through the windings of decoder relays 3TB4 and 3TB7, respectively, operating these relays.

In addition, it will be remembered that the last four digits of the fictitious number NU7–2439 which was related to the calling party by the intercept announcement are not the digits of the actual number temporarily assigned to station 104 at switching office 100, but these digits must be converted into the unlisted number 9979 which has been temporarily assigned to station 104. By converting the last four digits of the number which was announced to the calling customer into an unlisted number, the possibility of the calling party avoiding the nuisance call trap is minimized. For example, let us suppose that the called party's number was changed to NU7–9979 wherein the code NU7 causes the call to be routed via the centralized trapping facilities and the digits 9979 actually identify the working equipment terminal of the called station at local office 100. The calling party knowing that the called customer has not changed his residence might correctly deduce that the called party could be reached directly by prefixing the number 9979 with the proper central office designation of switching office 100 which is CH3. To preclude this possibility, therefore, the calling party is not informed of the acutal working number of the called party but is only given a number which must be further translated into the working number of the called line. If the called party wishes, he can inform his close associates of the unlisted working number CH3–9979 which they may dial directly and complete the connection to the called station without the necessity of complying with the foregoing procedure involving intercept facilities and the tandem office.

To effect the conversion of the fictitious number into the correct working number certain code conversion hundreds, tens and units digit holes have been punched on the NU7–243 card selected in the translator. In this illustrative embodiment the digits to be outpulsed, instead of the 2439, are the digits 9979, and the decoder is informed of this by the operation of two-out-of-five of the code conversion relays 3CCH-, 3CCT- and 3CCU-. For example, the output from the card is indicated by the operation of contacts 4CCH2 and 4CCH7 which extend ground over conductors 409 and 410, through contacts of translator connector relay 4C0, over conductors 411 and 412 to FIG. 3 and through the windings of relays 3CCH2 and 3CCH7, respectively, to battery. Decoder relays 3CCH2 and 3CCH7 operate indicating that the code conversion hundreds digit to be outpulsed is a 9. In a similar manner code conversion tens and units digit outputs are represented by the operated contacts 4CCT2, 4CCT7, 4CCU0 and 4CCU7 which operate decoder relays 3CCT2, 3CCT7, 3CCU0 and 3CCU7 thereby indicating to the decoder that the code conversion tens and units digits are 9 and 7, respectively.

When the decoder has received sufficient information from the card translator, decoder 301 extends battery over marker start lead MST and through the winding of marker preference relay 3MP to ground. Assuming that the marker 300 is idle, relay 3MP operates completing an obvious operating path for connector relay 3MC, and relay 3MC operates extending a plurality of conductors between the decoder 301 and marker 300.

For example, contacts of relays 3TB4 and 3TB7 extend ground over conductors 318 and 319, through contacts of relay 3MC, over conductors 320 and 321 and through the windings of marker relays 3TBA4 and 3TBA7, operating these relays and thereby transferring the trunk block information to the marker.

Relay 3MP also extends ground over conductor 306 and through the winding of decoder connector relay 3MCA operating that relay to interconnect marker 300 with sender 600. The marker can now forward the code conversion digits 997 to the sender in preparation for outpulsing the unlisted number assigned to the called station. For example, ground from contacts of relays 3CCH2 and 3CCH7 in decoder 301 is extended over conductors 307 and 308 in cable 309, through contacts of a connector relay (not shown) in marker connector 305 over cable 310, through equipment (not shown) in marker 300, through contacts of connector relays (not shown) in decoder connector 302, over cable 311 which is part of larger cable 7–3 to FIG. 7 and through the windings of relays 7CH2 and 7CH7, respectively, to battery operating relays 7CH2 and 7CH7. Similarly, ground is extended from contacts of relays 3CCT2, 3CCT7, 3CCU0 and 3CCU7 to operate relays 7CT2, 7CT7, 7CU0 and 7CU7 in sender 600 thereby registering the code conversion tens digit 9 and units digit 7 in the sender.

Figure 4:
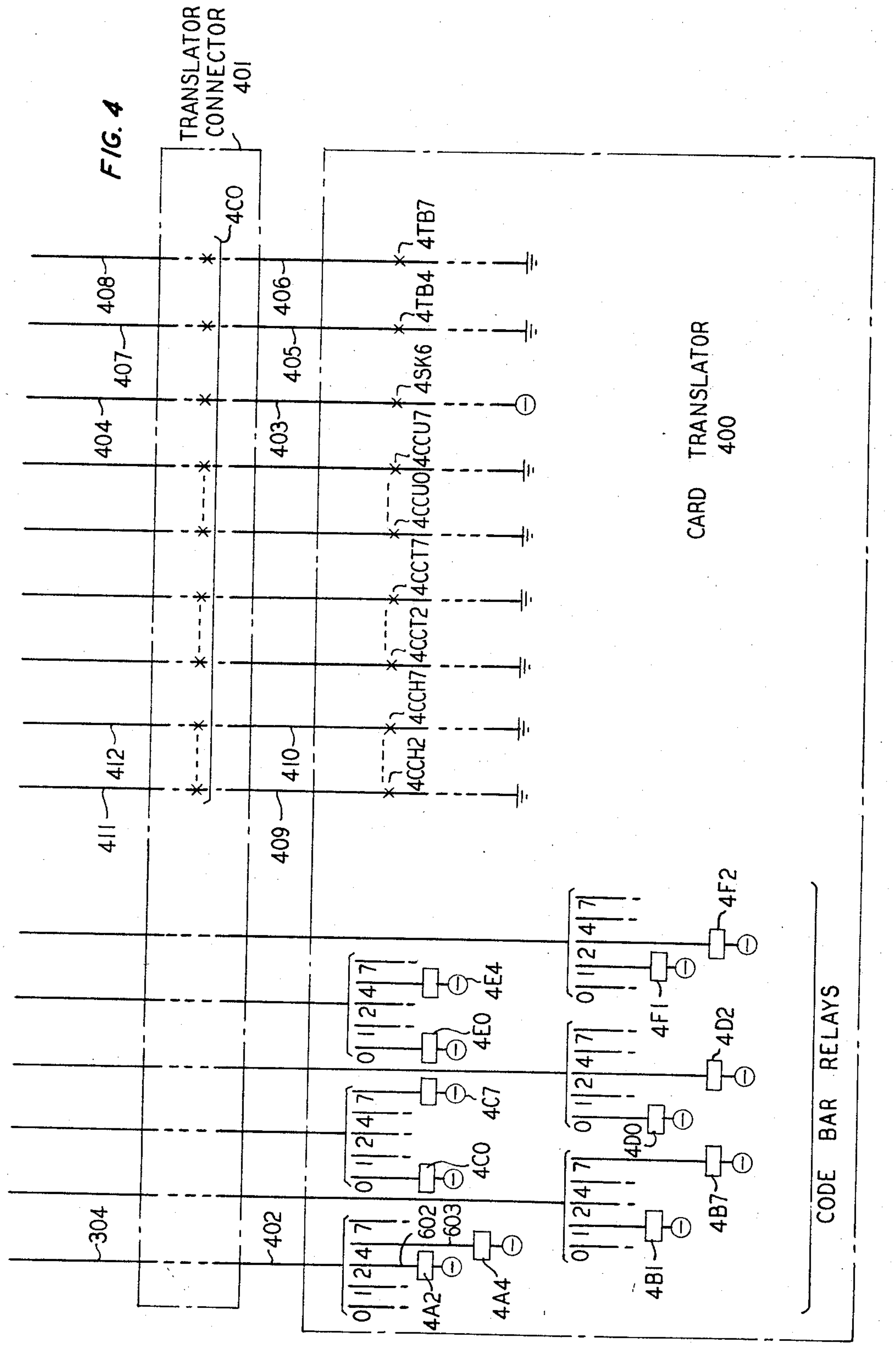
Figure 5:
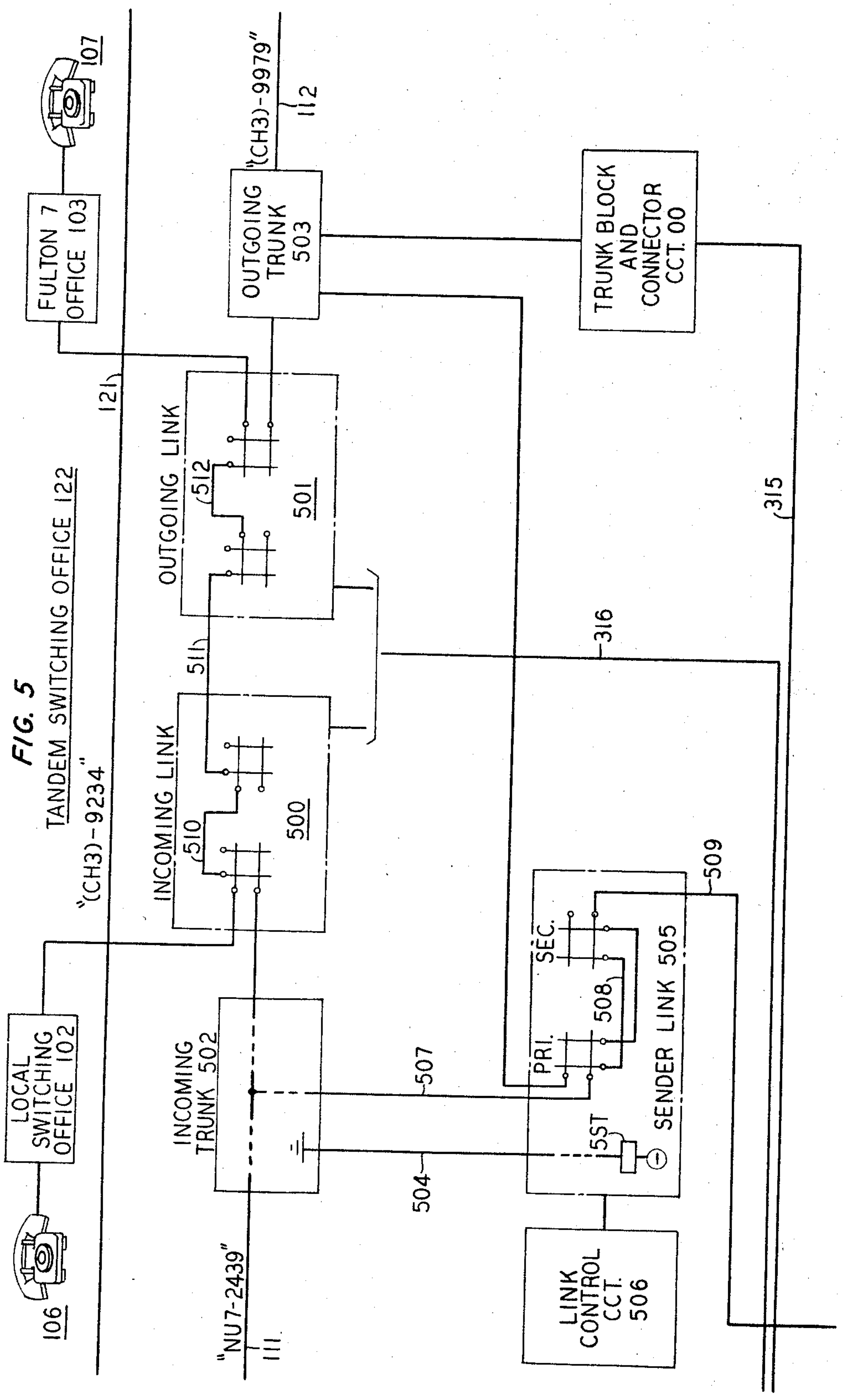
Figure 6:
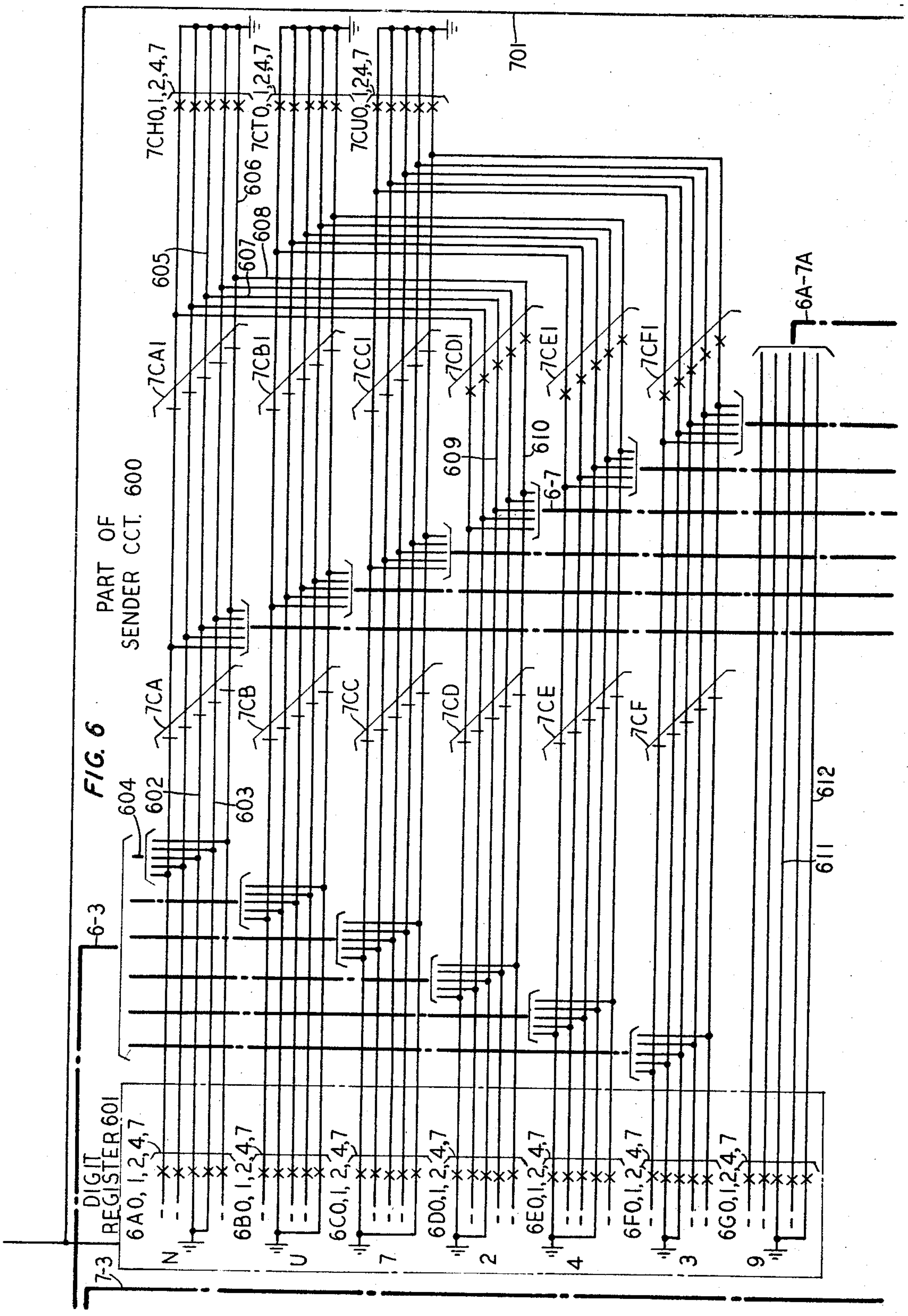

When the NU7–243 card was read in card translator 400 a "skip-6" hole in the card was punched as indicated by the operated contacts 4SK6 in FIG. 4. Battery was extened through these contacts over conductor 403, through contacts of relay 4C0 in translator connector 401, over conductor 404, through decoder equipment (not shown), over conductor 312, through contacts of relay 3MC in marker connector 305, over conductor 313 and through the winding of relay 3SK6 to ground, operating marker relay 3SK6. Relay 3SK6, in operating, extends ground over conductor 317, through contacts of relays 3MCA and 3SC in decoder connector 302, over conductor 314 in cable 7–3 to FIG. 7 and through the winding of relay 7SK6 to battery operating the sender skip-6 relay 7SK6. As will be discussed in more detail subsequently, the sender skip-6 relay will cause the sender to delete the first six digits stored on the 6A–6F registration relays in digit register 601 and outpulse the digits indicated by the operated code conversion hundreds, tens and units relays along with the remaining digits stored in the digit register. In the example being described, the six digits NU7–243 will be deleted and replaced by the code conversion digits 997 in preparation for outpulsing the called number 9979.

As a result of the other directive information received from decoder 301, marker 300 has, in the meantime, been selecting an idle outgoing trunk to called office 100 in preparation for extending the calls received over incoming trunk 502 from the calling office.

It will be remembered that relays 3TBA4 and 3TBA7 were operated in the marker to inform the marker that trunks to the called office, switching office 100, are located on truck block and connector circuit 00. Marker 300 utilizing control conductors 315 selects an idle trunk to the called office in a well-known manner which is set forth in the aforementioned Gooderham et al. patent.

While the marker 300 has been selecting an outgoing trunk it has been identifying the incoming link frame on which appears incoming trunk 502 from the calling office 101. Having identified the incoming trunk appearance, the marker can then test for an idle channel between the incoming trunk 502 and the selected outgoing trunk over test conductors 316. Once the channel has been selected a continuity test is performed to see if the channel is suitable for service before the marker relinquishes control of the connection. For ease of illustration it has been assumed that marker 300 has selected idle outgoing trunk 503 to the CHelsea 3 switching office 100, and marker 300 has established a channel comprising links 510, 511 and 512 between the incoming trunk 502 and the selected outgoing trunk 503.

When an idle outgoing trunk has been seized and the information received from the translator and decoder has been properly stored in the sender, marker 300 signals decoder 301 and translator 400 to release, making this equipment available for other calls. In addition, once having interconnected the incoming trunk 502 with the selected outgoing trunk 503 marker 300 can restore to normal relinquishing control of the connection to sender 600.

With incoming trunk 502 connected to outgoing trunk 503 over links 510–512 and with sender 601 connected to the incoming trunk 502 by way of sender link 505, a signal is transmitted over trunk conductors 112 to the called switching office trunk equipment 802 to cause an incoming register to be attached thereto in the manner previously described. When an incoming register, such as register 800, is attached to incoming trunk circuit 802 via incoming register link 801 a signal is transmitted back over trunk conductors 112 to the tandem office requesting sender 600 to outpulse the digits of the called number which are stored therein.

In addition to the equipment previously described, sender circuit 600 also comprises a multifrequency pulse generator and recapture circuit 700 for controlling the digits to be outpulsed. On certain calls outgoing sender 600 may outpulse the same digits it received from the calling office, that is, the digits stored in digit register 601. On other calls, such as the one being described, code conversion is required to translate the received number into the unlisted working number of the customer who has been receiving nusiance calls.

It will be remembered that the sender skip-6 relay 7SK6 had been operated in the sender along with relays 7CH2 and 7CH7, relays 7CT2 and 7CT7 and relays 7CU0 and 7CU7 which represent the coded conversion hundreds, tens and units digits 9, 9 and 7, respectively. With relay 7CH2 and 7SK6 operated, an obvious circuit is completed for operating relay 7CD. Relay 7CD in operating opens its contacts in FIG. 6 and disconnects the output of the 6D- registration relays from the MF pulse generator and recapture circuit 700. Similar paths are closed for operating relays 7CE and 7CF which disconnect the outputs of the 6E- and 6F- register relays, respectively, from the MF pulse generator and recapture circuit 700.

Subsequently, relay 7MRL1 operates and completes a path for operating relays 7CD1, 7CE1 and 7CF1 in FIG. 7. The operating path of relay 7MRL1 and other relays in the sender 600 have been purposely omitted to simplify the drawing. A disclosure of these relays and the description of their operation can be found in the aforementioned Gooderham et al. patent and need not be reiterated herein for a complete understanding of our invention.

With relays 7CD1, 7CE1 and 7CF1 operated in the sender, the code conversion hundreds, tens and units digits can be applied to the multifrequency pulse generator and recapture circuit 700 through the appropriate steering relays. For example, it will be recalled that relays 7CH2 and 7CH7 had been operated in the sender indicating that the first code conversion digit is a 9. Ground in FIG. 6 through contacts of these relays is extended over conductors 605 and 606, over conductors 607 and 608, through operated contacts of relay 7CD1 and over conductors 609 and 610 in cable 6–7 to FIG. 7 and to contacts of steering relay 7DS0. Similar circuits are completed for extending the code conversion tens digit 9 represented by the operated relays 7CT2 and 7CT7 to contacts of the steering relay 7ES0 and the code conversion units digit 7 which is represented by operated relays 7CU0 and 7CU7 to the contacts of the steering relay 7FS0 of the multi-frequency pulse generator and recapture circuit 700. With the three code conversion digits forward to the pulse generator and recapture circuit, the first three digits of the working number assigned to the called customer at station 104 in switching office 100 are ready for outpulsing. The last digit a 9 is forwarded directly from the 6G2 and 6G7 registration relays in digit register 601 over conductors 611 and 612 in cable 6A–7A to the contacts of steering relay 7GS0.

With relay 7CD1 operated, the operating path for the first steering relay 7DS0 is completed, this circuit can be traced from battery through the winding of relay 7DS0, through operated contacts of relays 7CD and 7CD1, through operated contacts of skip-6 relay 7SK6, through sender equipment (not shown) and through the operated contacts of relay 7MRL1 to ground thereby operating steering relay 7DS0.

Relay 7DS0 in cooperation with pulse generator and recapture circuit 700 causes the digit 9 to be outpulsed. This is accomplished by sending a combination of frequencies in a well-known manner over conductors 701 to FIG. 6 and over conductors 509, link 508 on sender link 505, over conductors 507, over the links 510, 511 and 512 of the tandem office switchtrain, over trunk conductors 112 to incoming trunk circuit 802 at the CHelsea 3 switching office 100 and over conductors 812 and 811 to the incoming register 800. Under control of a portion of the steering circuit, not shown, the 7ES0, 7FS0 and 7GS0 steering relays are operated in succession, and sender 600 at the tandem office outpulses the remaining three digits 979 in a similar manner and then releases from the connection.

Turning now to FIGS. 8 and 9, which depict the CHelsea 3 switching office, incoming register 800 has received the four digits 9979 which have been temporarily assigned to station 104. Recognizing that this is a number in the nine thousands series, marker 806 once again seizes number group 9000 to translate the four digit number into the line link frame equipment location. It will be noted that the number terminals L979, F979, and G979 for the unlisted number are cross-connected to indicate that the station assigned to number 9979 is located on line link frame 00, vertical group 0, horizontal group 0 and vertical file 4.

Marker 806 then seizes control of the trunk link frame 804 on which incoming trunk 802 appears and seizes control of line link frame 00 to which the line for station 104 is connected and interconnects the trunk with the line over links such as 813, 814 and 815. The incoming trunk 802 functions in a normal manner to apply a ringing signal over the connection to alert the customer at station 104.

*Annoyed customer traps nuisance call*

At station 104 the called customer responds to the ringing signal by lifting his receiver. The called customer can now converse with the calling party over the connection established between the switching offices 100 and 101 via tandem switching office 122.

If the customer at station 104 desires to have the call traced, he can operate a signaling device at his station to transmit a special nuisance call tone over the connection to the calling office.

In the illustrative embodiment of our invention the customer merely operates key 125 to extend ground over conductor 817 to operate trap relay TP. Relay TP in operating closes its contacts to connect tone source 108 to line conductors 819 and back over the established transmission path to the calling office in FIG. 2. The details of the tone source 108 need not be shown herein for a complete understanding of our invention since tone sources suitable for use in our invention are well known. One example of such a source is shown in the J. W. Taylor patent 2,077,537 of April 20, 1937. In the alternative an arrangement which is actuated by the called customer's dial to transmit a special information signal can be used. One such arrangement is disclosed in the copending application of C. Abert, D. E. Anderson and A. Zarouni, Serial No. 426,729, filed January 21, 1965, now Patent 3,385,933.

Turning now to the calling office in FIG. 2 the tone transmitted from tone source 108 in FIG. 8 is received over the trunk conductors 111 and is transmitted through repeat coil 215 to the tone detector 109. Tone detector 109 can be any suitable tone detector responsive to the particular signals received. Examples of such tone detectors are shown in the aforementioned Taylor patent and in the Abert-Anderson-Zarouni application.

Upon receipt of the tone, contacts 216 are closed in tone detector 109 to extend ground to the sleeve conductor 228 in parallel with the ground from relay 2S1. It will be recalled that ground on the sleeve conductor will hold operated the hold magnets 2LH, 2LJH and 2TJH to prevent the connection at switching office 101 from releasing. In addition, contacts 217 in tone detector 109 are closed to actuate alarm 110 which alerts the maintenance man at switching office 101 indicating that a nuisance call has been trapped and requires tracing.

While the arrangement described above contemplates manual tracing of the connection at switching office 101, it will be understood that automatic identification of the calling line is possible with automatic number identification systems that are well known in the prior art.

One example of such an identification system is disclosed in patent 3,071,650 to H. D. Cahill and C. H. Dagnall, Jr. of Jan. 1, 1963 which is hereby incorporated by reference as though fully disclosed herein.

In the Cahill et al. patent there is shown an arrangement for automatically identifying the calling customer and transmitting the identification to a tandem office where charge recording equipment is located. While a detailed description of the Cahill et al. patent is not necessary for a complete understanding of our invention, a brief description of the arrangement will be helpful in showing how the automatic numbering identification system can be used for recording the identity of nuisance callers.

As was set forth in the above-referred-to Cahill et al. patent, the automatic identification system includes an outpulser link such as link 219, a plurality of outpulsers such as outpulser 220, an identification network such as network 221 and an identifier designated 222 in FIG. 2 of the instant drawing. When the called number has been transmitted by the local switching office 101 to the tandem office, the trunk circuit 206 initiates the operation of outpulser link 219 to connect the trunk 206 with an idle ouptulser such as outpulser 220. Outpulser 220 then seizes identifier 222 which causes oscillator 223 to apply a signal over conductor 224 to the sleeve of the connection and back over the sleeve of the switchtrain connection (i.e., links 211–213) to the sleeve conductor of the calling line. The sleeve conductor of the calling line is connected over conductor 225 to a terminal in the number network individual to the calling line directory number. Thus, the signal on the sleeve of a particular line causes the directory number of that line to be produced on the output conductors of the number network and the number is identified by identifier 222. Identifier 222 then passes the information to outpulser 220 which outpulses the calling line number to the tandem office. Appropriate equipment such as the centralized automatic message accounting system shown in patent 2,848,543 to R. N. Breed et al. of Aug. 19, 1958 can be provided at the tandem office 122 to register the number of the calling line.

An alternative method of automatically identifying the calling line can also be used in certain offices that are equipped with translators for converting the calling line equipment location into the proper directory number.

For example, when the outgoing sender is attached to the connection at the calling office the outgoing sender is primed with the called line number for outpulsing and the calling line equipment location. The calling line equipment location could readily be translated into the calling line number and pulsed forward to the tandem switching office during the establishment of the connection through the tandem office in a well-known manner.

It will be recalled that in accordance with one feature of our invention the customer receiving nuisance calls has his directory number disconnected, and all calls to that number are intercepted. Also, a special unlisted number is temporarily assigned to the customer and a fictitious number different from the unlisted number was announced to all customers calling the intercepted directory number. It was also mentioned above that the annoyed customer could reveal the unlisted number to his close associates so they could call directly to his station and avoid placing calls via the tandem call holding facilities. While certain precautions can be taken to avoid the disclosure of the unlisted number to unauthorized persons, it may be desirable to provide additional safeguards by preventing any calls from being made directly to the unlisted number and thereby permitting these calls to bypass the call holding facilities. For example, equipment at the CHelsea 3 switching office can be arranged so that only calls from the tandem switching office 122 can be completed to the unlisted number CH3–9979. This can be accomplished through various methods one of which has been illustrated in FIG. 8. More specifically, switching office 100 can be arranged so that calls which are handled in a special manner, such as the nuisance calls described above, are designated with a special incoming trunk class as indicated by the operation of incoming trunk class relay 8ITC. Incoming class relay 8ITC in cooperation with other marker circuitry and number group 9000 will permit calls to be completed to the annoyed customer but calls bearing any other incoming trunk class designation will be blocked. Thus, all calls to the annoyed customer must be routed via the call holding facilities.

As another alternative, the numbers temporarily assigned to customers receiving nuisance calls could be separated from the rest of the numbers at the called party's central office to insure that all calls reaching the temporary numbers were routed via the tandem office call-holding trunks.

It is to be understood that the above-described arrangements are merely illustrative of the application of the principles of the invention. Numerous other arrangements may be devised by those skilled in the art without departing from the spirit and scope of the invention.

What is claimed is:

1. An arrangement for identifying the origin of calls in a telephone system comprising a plurality of customer lines each including line equipment and a directory number associated therewith, means for disconnecting from service the particular directory number associated with a called one of said lines, means for announcing to the customer lines calling said particular directory number a fictitious number temporarily assigned to said called line, call holding means, and means for directing the connection of lines calling said fictitious number to said called line via said call holding means, said call holding means including means for blocking the release of a calling one of said lines from said connection.

2. An arrangement for identifying the origin of calls in a telephone system comprising a plurality of customer lines each including line equipment and a directory number for obtaining access to said line equipment, means for disconnecting from service the particular directory number associated with a called one of said lines, means for announcing to the customer lines calling said particular directory number a fictitious number temporarily assigned for access to said called line equipment, call holding means, and means for directing the connection of lines calling said fictitious number to said called line equipment via said call holding means, said call holding means including means responsive to signals from said called line for blocking the release of said calling line from said connection.

3. An arrangement for identifying the origin of calls in a telephone system comprising, a plurality of customer lines each including line equipment and a directory number assigned thereto, means for disconnecting from service the particular directory number assigned to a called one of said lines and for temporarily associating therewith a special number for access to said called line equipment, means for announcing to the customer lines calling said particular directory number a fictitious number different from said special number, call holding means and means for directing the connection of lines calling said fictitious number to said call holding means, said call holding means comprising means for translating said fictitious number to said special number, means responsive to the receipt of said special number for extending a connection from said calling line to said called line, and means responsive to said called line for blocking the release of said calling line from said connection.

4. In a telephone system, a plurality of lines each identified by a directory number, means responsive to directory number signals from a calling one of said lines for interconnecting said calling line with the called line identified by said directory number, means for intercepting calls to a particular one of said called lines including means for announcing to said calling line a fictitious number temporarily assigned to said particular called line, a call holding trunk, and means responsive to the receipt of fictitious number signals from said calling line for routing said calls to said particular called line via said call holding trunk, said call holding trunk including means under control of said particular called line for identifying said calling line connected thereto.

5. In a telephone system, a plurality of switching offices each including customer lines and switching means for interconnecting said customer lines, each said line comprising line equipment and a directory number associated therewith for access to said line equipment, and an arrangement for identifying lines calling a particular one of said called lines comprising centralized call holding facilities, means for disconnecting the directory number of said called line and for associating therewith a fictitious number, means for announcing the fictitious number to lines calling the directory number of said called line, means for directing all calls to said fictitious number over said centralized call holding facilities to said called line equipment, and means controlled by said called line for blocking the release of a calling line equipment connected to said called line via said call holding facilities.

6. In a telephone system, a plurality of customer lines each having a directory number associated therewith, means for disconnecting from service the directory number of a called one of said lines, means for intercepting calls to said disconnected directory number and for announcing to said calling lines a fictitious number temporarily associated with said called line, call holding means, means for directing the connection of lines calling said fictitious number to said called line via said call holding means, and means coupled to said called line for transmitting a signal to said call holding means, said call holding means including means responsive to said signal for blocking the release of the calling line connected to said called line via said call holding means.

7. In a telephone system, a plurality of switching offices each identified by a different office code; a plurality of customer lines coupled to said offices and each identified by an assigned address code comprising one of said switching office codes and a regular number address; and an arrangement for identifying lines calling a called one of said lines comprising centralized holding means identified by a special code, means for changing the regular number address of said called line to a special number address, means for intercepting lines calling the assigned address code of said called line and for announcing to the calling lines a fictitious address code temporarily assigned to said called line, said fictitious address code comprising said holding means special code and a number address other than said regular and said special number address, and means at said switching offices for directing calls to said fictitious address code via said holding means, said holding means comprising means for translating said theoretical address code into said special number address for completing a connection to said called line, and means responsive to signals from said called line for blocking the release of said calling lines from said holding means connection.

8. The invention defined in claim 7 wherein said holding means also comprises means for translating said theoretical address code into said office code identifying the switching office of said called line.

9. A method for tracing the origin of calls directed to a called line in a telephone system comprising the following steps, disconnecting from service the number assigned to said called line and directing calls for said assigned number to intercept facilities, advising lines calling said called line of a fictitious number temporarily replacing said assigned number, directing calls for said fictitious number over a call holding trunk to said called line, and blocking the release of said calling line from said holding trunk under the control of said called line.

10. A method for ascertaining the origin of anonymous calls directed to a called line in a telephone system comprising the following steps, disconnecting from service the telephone directory number of said called line, directing calls for said directory number to intercept, assigning a special number for access to said called line, advising lines calling said directory number of a fictitious number temporarily replacing said directory number and different from said special number, directing lines calling said fictitious number to call holding facilities, translating said fictitious number to said special number and extending the call to said called line, and blocking the release of said calling line under control of said call holding facilities.

11. A method for ascertaining the origin of anonymous calls originated from any office in a telephone network and directed to a called line at any said office in said network comprising the following steps, disconnecting from service at the called office the telephone directory number of the called line receiving said anonymous calls, connecting a special number for access to said called line, intercepting calls for said disconnected directory number, announcing to lines calling said disconnected directory number a fictitious central office code different from the called office code and a fictitious number different from said special access number, routing lines calling said fictitious central office code over call holding trunks to a tandem office common to said other offices translating said fictitious office code and fictitious number into the called office code and said special access number, extending a connection from said tandem office to said called line via said special access number, and signaling from said called line over said connection to hold the connection for identifying said calling line.

12. In a telephone network a plurality of local switching offices each identified by a local office code and each comprising line terminals identified by an address, customer lines connected to said terminals, regular trunks connected to other of said local offices and switching means responsive to signals from a calling one of said lines representing the local office code and terminal address of a called one of said lines for interconnecting said calling and called lines over one of said regular trunks; means for disconnecting said called customer line from a first one of said terminals and connecting said called line to a second one of said terminals; means for intercepting lines calling the local office code and the first terminal address of said called line and announcing to said calling lines a fictitious office code and a special address other than the address of said first and second terminals; a tandem switching office common to said local offices and comprising special trunks to said local offices; means at said local offices responsive to signals from said calling line representing the fictitious office code and special address for interconnecting said calling line and said tandem office via one of said special trunks therebetween; means for forwarding information comprising said fictitious office code and special address to said tandem office; means at said tandem office responsive to the receipt of said information for translating said information into the local office code and the special terminal address of said called line and for establishing a connection to said called line; and means coupled to said called line for transmitting a special signal over said connection to said tandem office; said special trunk comprising means responsive to said special signal for permitting the identification of said calling line.

13. The invention defined in claim 12 wherein said special trunk comprises means under control of said calling line for releasing the connection between said calling line and said tandem office and wherein said means responsive to said special signal includes means for blocking said releasing means.

No references cited.

KATHLEEN H. CLAFFY, *Primary Examiner.*

A. H. GESS, *Assistant Examiner.*